Patented Jan. 18, 1944

2,339,346

UNITED STATES PATENT OFFICE 2,339,346

PROCESS FOR MAKING DICARBONYLIC COMPOUNDS

Raymond W. McNamee, South Charleston, and Jesse T. Dunn, Charleston, W. Va., assignors to Carbide and Carbon Chemicals Corporation, a corporation of New York No Drawing. Application July 30, 1940, Serial No. 348,439

13 Claims. (Cl. 260—603)

Dicarbonylic compounds may be obtained at present by careful oxidation of dihydric alcohols with chemical oxidizing agents, notably nitric acid and selenium dioxide. The disadvantages of such methods are the cost of the oxidizing agents required and the explosive and toxic hazards involved.

It has been proposed to manufacture dicarbonylic compounds by the direct oxidation of dihydric alcohols with molecular oxygen in amounts less than that theoretically required, i. e., less than one mol of oxygen per mol of the dihydric alcohol. This method of operation suffers from the disadvantage that lower oxidation products of the dihydric alcohols than dicarbonylic compounds often result and the dicarbonylic compounds which are formed have a pronounced tendency to react with the excess dihydric alcohol to form high-boiling, stable acetals or other complex condensation products. Under certain conditions, as pointed out in our copending application Serial No. 348,438, which will be referred to in more detail later, these disadvantages may be avoided but the conditions of the oxidation are then sufficiently severe to cause undesirably large amounts of monocarbonylic compounds and carbon oxides to be formed.

This invention provides specific improvements in the process for making aliphatic dicarbonylic compounds, notably dialdehydes, diketones, and ketoaldehydes, containing up to five carbon atoms, by the catalytic vapor phase oxidation of alkylene glycols or polyalkylene glycols, in which the alkylene group of the glycols contains up to five carbon atoms. (In subsequent descriptions the term "glycols" will be used to include both monoglycols and polyglycols.) According to this invention, the amount of carbon oxides and monocarbonylic compounds produced, which tend to form in a greater or lesser degree depending on the conditions, is minimized by the inclusion in the reaction zone of a repressant for the oxidations giving rise to these compounds. Also, by means of this invention, a substantially complete conversion of the glycols to oxidation products is obtained and no significant amounts of reaction products of the glycols with the dicarbonylic compounds are formed. Under these circumstances, the inclusion in the oxidation zone of a repressant for reactions giving rise to carbon oxides and monocarbonylic compounds causes the desired dicarbonylic compounds to be obtained with high efficiency.

The primary object of the invention is the preparation of glyoxal and pyruvic aldehyde by the oxidation of ethylene glycol or propylene glycol or polyethylene or polypropylene glycols, such as the di-, tri-, tetra-, penta-, or hexaethylene or propylene glycols. Other dicarbonylic compounds to which the invention relates include diacetyl, prepared by the oxidation of 2,3 butylene glycol; malonic dialdehyde, prepared by the oxidation of 1,3 propylene glycol; formyl acetone, from the oxidation of 1,3 butylene glycol; succinic dialdehyde, from the oxidation of 1,4 butylene glycol; and laevulinic aldehyde, from the oxidation of 1,4 amylene glycol.

Glyoxal and pyruvic aldehyde are chemicals of interesting and unusual properties. Glyoxal is a greenish-yellow solid melting at 15° C. and boiling at 51° C. It is difficult to isolate in the monomeric form because it polymerizes readily and because it readily forms a colorless hydrate with water. Pyruvic aldehyde is a low-boiling liquid of similar properties. Both chemicals are extremely reactive by virtue of the two carbonyl groups which they contain and they are useful as intermediates in a variety of syntheses. By means of this invention, these products may be produced in economic yields which enables their reactive characteristics to be utilized industrially.

The oxidation of the glycols previously mentioned to dicarbonylic compounds is conducted in the vapor phase and in the presence of an oxidation catalyst. The catalyst which may be selected for promoting the desired oxidation is preferably composed of copper and several forms of copper catalysts may be used. A particularly effective type is one composed of turnings of a copper alloy containing from 94.4% to 96% copper, from 3% to 4.5% silicon and from 1.0% to 1.1% manganese. A supported copper catalyst may be formed by impregnating particles of a catalyst support consisting of ceramically bonded fused aluminum oxide with a concentrated boiling solution of copper nitrate and roasting the resultant material at 400° C. until a firm deposit of copper oxide is obtained. Supported catalysts of this kind desirably contain from about 3% to about 8% copper. The copper oxide catalysts may also contain small amounts of manganese oxide as an adjuvant catalyst or they may be promoted by the addition of activated alumina. Such catalysts are very active but they necessitate close control of the reaction. Other oxidation catalysts, notably silver, silver oxide, and molybdic oxide promoted by titanium oxide have outstanding catalytic action on the oxidation of the glycols and good yields of dicarbonylic compounds have been obtained in the presence of these catalysts.

The temperature and rate of feed of the glycol to be oxidized are not critical but preferred operating ranges exist. Temperatures within the range of 225° C. to 450° C. are the desired operating levels and the preferred temperature is between 275° C. and 350° C. The rate of feed of the glycol to the oxidation zone may vary widely; the desired operating range being between 50 to 250 grams per hour per liter of catalyst space.

In the oxidation of the designated glycols to the corresponding dicarbonylic compounds, there is a tendency for rupture of a carbon to carbon linkage to occur and for monocarbonylic or carboxylic compounds of a lower number of carbon atoms than the glycol to be formed. In addition there is a tendency for the glycols to be destructively oxidized to oxides of carbon and to water. These tendencies are accentuated if a substantial excess of molecular oxygen is present in the oxidation zone. As described and claimed in our copending application Serial No. 348,438, it is desirable to use an excess of oxygen (at least 1.8 mols of oxygen per mol of glycol) over that required to convert each carbinol group of the glycol to a carbonyl group to prevent the formation of lower oxidation products of the glycols than the corresponding dicarbonylic compounds and of high-boiling, relatively stable derivatives of the dicarbonylic compounds with the unchanged glycols. In the formation of glyoxal or pyruvic aldehyde by the direct oxidation of ethylene or proplyene glycol the tendency toward the formation of formaldehyde and toward destructive oxidation of the glycol to oxides of carbon is pronounced.

According to the present invention, it has been found that these tendencies may be suppressed or substantially eliminated by including in the oxidation zone containing the molecular oxygen and glycol vapors, small controlled amounts of halogens or halogenated organic compounds. These materials act as selective repressants for the severe oxidations which rupture a carbon to carbon linkage of the glycols or cause their complete destruction. By virtue of this selective repressant action, high yields of the desired polycarbonylic compounds are produced since the glycols may be practically completely converted to oxidation products, which is necessary in order that lower oxidation products of the glycols or derivatives of the dicarbonylic compounds with the unchanged glycols may not predominate in the reaction products, without encountering large losses of the starting material through undesired oxidations.

Typical halogens and halongenated organic compounds which may be utilized as selective repressants are chlorine and bromine; and ethylene dichloride, propylene dichloride, trichlorethylene, tetrachlorethylene, carbon tetrachloride, ethyl chloride, vinyl chloride, propyl chloride, butyl chloride, amyl chloride, dichlorbenzene, chlorbenzene, dichloridiethyl ether, and dichlordiisopropyl ether. The amount of repressant which is required, is, as stated before, small, and convenient operating limits are between 0.002% and 0.30% by volume of the total amount of gases present or passing through the oxidation zone. Under the usual operating conditions this will amount to about 0.10% to about 15.0% by weight of the glycol introduced to the oxidation zone.

So far as present knowledge indicates, smaller amounts of repressant than the lower limit indicated above are not effective and greater amounts than the upper limit are not beneficial. Although it does not appear that such greater amounts render the catalyst completely inactive, the yields of dicarbonylic compounds obtained under these conditions are greatly reduced. However, this is partially compensated for by an increased efficiency of the process because the amounts of monocarbonylic compounds and carbon dioxide produced are correspondingly extremely small. Another factor, moreover, which makes the use of greater amounts of repressant seem undesirable is that, as a consequence of the relationships discussed above, free glycol will be present in the oxidation products and, it will be recalled, the dicarbonylic compounds tend to react with the glycols under these circumstances to form high-boiling, relatively stable acetals.

The action of the repressant may perhaps be ascribed to the influence it exerts on the catalyst, either by a physical or chemical change of its surface. This influence is temporarily persistent and the repressant may be introduced intermittently with the reactants if desired. In operation, the amounts of the selective repressant added to the reactants are controlled according to the conditions prevailing in the oxidation zone. If unduly large amounts of monocarbonylic compounds and carbon dioxide are being formed, the amount of repressant introduced is increased. On the contrary, if it appears that the catalyst is becoming somewhat inactive in promoting the desired oxidation, the concentration of repressant in the oxidation zone is reduced. To provide for flexibility of control, the repressant is preferably added in vaporized form to the gases comprising the reactants rather than mixed with the liquid glycol to be oxidized.

The improvements brought about by the action of these repressants are noteworthy. Thus, in an experiment performed in which two parts by volume of ethylene glycol were passed with 20 parts by volume of molecular oxygen and 78 parts of nitrogen over a copper catalyst at 325° C. in the absence of a repressant, glyoxal was obtained in a 23% yield and formaldehyde in a 21% yield. In another experiment performed under identical conditions with the exception that a small amount of ethylene dichloride was present as a repressant, the ratio between the two products was markedly altered, a 32% yield of glyoxal and an 11% yield of formaldehyde being obtained.

As described in our copending application Serial No. 348,440, it is preferred to use materials of construction for the oxidation converter, other than iron, which do not exert an adverse catalytic effect on the oxidation of the glycols to dicarbonylic compounds. However, distinct improvements in yields of these compounds are obtained even in oxidations carried out in iron equipment if a repressant is present. This is shown in the following comparative experiments in which an iron tube, 3 feet long and 1 inch in diameter, was used as the converter and the catalyst bed extended two feet in length and consisted of turnings of a copper-silicon-manganese alloy.

|  | No repressant | Ethylene dichloride repressant (0.02% by volume) |
|---|---|---|
| Temperature _____ °C _ | 325 | 325 |
| Total gas feed _____ cubic feet per hour _ _ | 8.5 | 8.5 |
| Oxygen in feed _____ per cent by volume _ _ | 20 | 20 |
| Ethylene glycol in feed _____ do _ _ _ _ | 1.5 | 2.0 |
| Glyoxal yield _____ per cent _ _ | 2.6 | 6.0 |
| Formaldehyde and formic acid yield _ _ _ do _ _ _ _ | 19.4 | 10.0 |

As indicated previously, it is preferred to carry out the oxidation reaction in converters made of materials, other than iron, which do not exert an adverse catalytic action on the desired oxidation. These materials include aluminum, copper, alloys of copper, and the iron-nickel-chromium alloys commonly known as stainless steel. However, as shown by the following comparative experiment, the presence of a repressant in oxidation carried out in equipment fabricated from these materials provides increased efficiency.

A converter three feet in length and one inch in diameter was constructed of the alloy of copper, silicon and manganese previously described. The catalyst consisted of turnings of the same copper alloy and extended through two feet of the converter. Vapors of ethylene glycol mixed with air were passed through the tube both in the presence of 0.02% by volume of ethylene dichloride as a repressant and in its absence. The results obtained in each case are tabulated below:

|  | No repressant | Repressant |
|---|---|---|
| Temperature _____ °C _ _ | 350 | 325 |
| Total gas feed _____ cubic feet per hour _ _ | 8.5 | 8.5 |
| Oxygen in feed _____ per cent _ _ | 20.0 | 20.0 |
| Ethylene glycol in feed _____ do _ _ _ _ | 1.5 | 2.0 |
| Glyoxal yield _____ do _ _ | 16.0 | 45.0 |
| Formaldehyde and formic acid yield _ _ _ _ do _ _ _ _ | 28.8 | 12.5 |

The following examples illustrate several features of the invention:

Example 1—Oxidation of ethylene glycol

A large-scale experiment on the oxidation of ethylene glycol to glyoxal was carried out. The apparatus consisted of a tube of a copper-silicon-manganese alloy 25 feet long and 1 inch in diameter. A length of 15 feet of the tube was filled with 2.5 liters of a catalyst prepared by impregnating particles of ceramically bonded fused aluminum oxide with a boiling solution of copper nitrate (specific gravity 1.75 at 135° C.) and roasting the resultant material at 400° C. until a deposit of copper oxide was formed. The amount of copper oxide on the catalyst support was about 5% by weight. The duration of the experiment was 75 hours, during which time 200 cubic feet per hour of gas, containing 10% oxygen, along with the vapors of 223 grams of ethylene glycol per hour, were passed over the catalyst at a temperature of 300° C. A repressant was intermittently added to the reactants at a controlled rate by including with them from 0.0 to 4.0 cubic feet per hour of nitrogen saturated with ethylene dichloride at room temperature. It was found that the amount of carbon dioxide in the exit gases was an inverse function of the amount of repressant. Thus, in the first 48 hours of the experiment, the concentration of carbon dioxide was 0.8% by volume, and subsequent increases in the amount of repressant introduced reduced the concentration of carbon dioxide to 0.6% for the next 7 hours and to 0.5% for the last 20 hours.

Glyoxal was obtained in a 50% overall yield and at a production rate of 43 grams per liter of catalyst space per hour. The yield of formaldehyde was 8%. The conversion of ethylene glycol to oxidation products was substantially complete.

Glyoxal may be removed in the form of its hydrate from the exit gases by passing them through a water scrubber and the effluent gases from the scrubber may be recycled if desired. Purified glyoxal can be recovered from the aqueous solution formed in the scrubber by adding a solvent for the glyoxal, such as dioxane, to the aqueous solution, removing most of the excess water by azeotropic distillation with benzene and then distilling over the dioxane along with monomeric glyoxal. This distillate is caught in water and the dioxane may be removed therefrom by distillation or extraction. The glyoxal may also be separated from the dry dioxane solution by flash evaporation by passing the solution into a kettle containing a hot liquid such as dimethoxy tetraethylene glycol.

Example 2—Oxidation of propylene glycol

Two experiments on the oxidation of propylene glycol over the copper catalyst described in Example 1 were carried out. In one, the reaction tube was 3 feet long and 1 inch in diameter and was made of a copper-silicon-manganese alloy. The temperature was maintained at 330° C., and 8.5 cubic feet of gas per hour, containing by volume 15% oxygen, 1.1% propylene glycol vapor and a small amount of ethylene dichloride as an inhibitor were passed over the catalyst. A yield of 68% pyruvic aldehyde and 7% formaldehyde and formic acid was obtained.

In the other experiment, a reaction tube of stainless steel, but of the same dimensions as before, was used. The temperature of the catalyst bed was regulated at 320° C. and 8.5 cubic feet per hour of gas containing by volume 8.5% oxygen, 2.0% propylene glycol vapor, and a small amount of ethylene dichloride as a repressant were passed through the tube. A yield of 63% pyruvic aldehyde and 6% formaldehyde and formic acid was obtained.

Example 3—Oxidation of diethylene glycol

The apparatus used was the tube of copper-silicon-manganese alloy described in the preceding example and the catalyst consisted of turnings of the same metal. The temperature was adjusted to 310° C. and 8.5 cubic feet per hour of gas containing by volume 10% oxygen, 0.8% diethylene glycol and a small amount of ethylene dichloride was passed over the catalyst. A yield of 18% glyoxal and 8% formaldehyde and formic acid was obtained.

Example 4—Oxidation of triethylene glycol

The apparatus and catalyst were the same as described in Example 3. Eight and one-half cubic feet per hour of gas containing by volume 10% oxygen, 0.7% triethylene glycol and a small amount of inhibitor were passed over the catalyst at a temperature of 300° C. A yield of 10% glyoxal and 1% formaldehyde was obtained.

Modifications of the invention other than as described in the foregoing examples will be apparent to those skilled in the art and are included within the scope of the invention as defined by the appended claims.

We claim:

1. Process for making one of the group consisting of aliphatic dicarbonylic compounds having up to five carbon atoms and hydrates and polymers of these compounds which comprises catalytically oxidizing the vapors of one of the group consisting of alkylene glycols and polyalkylene glycols, in which the alkylene group of the glycols contains up to five carbon atoms with molecular oxygen in the presence of small controlled amounts of a repressant of the group consisting of halogens and halogenated organic compounds capable of being volatilized with said vapors.

2. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with molecular oxygen, over one of the group consisting of metal and metal oxide oxidation catalysts at a temperature between 225° and 450° C., and controlling the amounts of monocarbonylic compounds and oxides of carbon formed by adding to the reactants between about 0.002% and about 0.30% by volume of the total gases present of a repressant of the group consisting of halogens and halogenated organic compounds capable of being volatilized with said vapors.

3. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with molecular oxygen, over one of the group consisting of metal and metal oxide oxidation catalysts at a temperature between 225° and 450° C., and controlling the amounts of monocarbonylic compounds and oxides of carbon formed by adding to the reactants between about 0.002% and about 0.30% by volume of the total gases present of a repressant comprising chlorinated organic compounds having up to six carbon atoms to the molecule.

4. Process for making one of the group consisting of aliphatic dicarbonylic compounds having up to five carbon atoms and their hydrates and polymers which comprises mixing the vapors of one of the group consisting of alkylene glycols and polyalkylene glycols, in which the alkylene group of the glycols contains up to five carbon atoms, with an excess of molecular oxygen over that theoretically required for the formation of the carbonylic groups in said compounds by oxidation of the corresponding carbinol groups, passing the vapors over a silver oxidation catalyst at a temperature between 225° and 450° C., and controlling the amounts of monocarbonylic compounds and oxides of carbon formed by adding to the reactants small amounts of a repressant of the group consisting of halogens and halogenated organic compounds capable of being volatilized with said vapors.

5. Process for making one of the group consisting of aliphatic dicarbonylic compounds having up to five carbon atoms and their hydrates and polymers which comprises mixing the vapors of one of the group consisting of alkylene glycols and polyalkylene glycols, in which the alkylene group of the glycols contains up to five carbon atoms, with an excess of molecular oxygen over that theoretically required for the formation of the carbonylic groups in said compounds by oxidation of the corresponding carbinol groups, passing the vapors over a copper oxidation catalyst at a temperature between 225° and 450° C., and controlling the amounts of monocarbonylic compounds and oxides of carbon formed by adding to the reactants small amounts of a repressant of the group consisting of halogens and halogenated organic compounds capable of being volatilized with said vapors.

6. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with at least 1.8 mols of molecular oxygen per mol of glycol, over an oxidation catalyst in a confined space enclosed by an alloy having a copper base, and controlling the amounts of monocarbonylic compounds and oxides of carbon formed by adding to the reactants small amounts of a repressant of the group consisting of halogens and halogenated organic compounds capable of being volatilized with said vapors.

7. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with at least 1.8 mols of molecular oxygen per mol of glycol, over a copper catalyst at a temperature between 225° C. and 450° C., and controlling the amounts of monocarbonylic compounds and oxides of carbon formed by adding to the reactants small amounts of a repressant of the group consisting of halogens and halogenated organic compounds capable of being volatilized with said vapors.

8. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with at least 1.8 mols of molecular oxygen per mol of glycol, over a copper catalyst, at a temperature between 225° C. and 450° C., in a confined space enclosed by an alloy having a copper base, and controlling the amounts of monocarbonylic compounds and oxides of carbon formed by adding to the reactants small amounts of a repressant of the group consisting of halogens and halogenated organic compounds capable of being volatilized with said vapors.

9. Process for making hydrates of glyoxal which comprises catalytically oxidizing the vapors of a glycol containing at least one oxyethoxy group with molecular oxygen in the presence of small controlled amounts of a repressant of the group consisting of halogens and halogenated organic compounds capable of being volatilized with said vapors.

10. Process for making hydrates of glyoxal which comprises mixing the vapors of a glycol containing at least one oxyethoxy group with an excess of molecular oxygen over that theoretically required for the formation of the carbonyl groups in the glyoxal by the oxidation of the corresponding carbinol groups, passing the vapors over one of the group consisting of metal and metal oxide oxidation catalysts at a temperature between 225° and 450° C., and controlling the amounts of formaldehyde formed by adding to the reactants small amounts of one of the group consisting of halogens and halogenated organic compounds capable of being volatilized with said vapors.

11. Process for making hydrates of glyoxal which comprises mixing the vapors of ethylene glycol with an excess of molecular oxygen over that theoretically required to oxidize each carbinol group to a carbonyl group, passing the vapors over a copper oxidation catalyst at a temperature between 225° and 450° C., controlling the amounts of formaldehyde formed by adding to the reactants small amounts of one of the group consisting of halogens and halogenated organic compounds capable of being volatilized with said vapors, and recovering a hydrate of glyoxal from the oxidation products.

12. Process for making hydrates of glyoxal which comprises mixing the vapors of ethylene glycol with an excess of molecular oxygen over that theoretically required to oxidize each carbinol group to a carbonyl group, passing the vapors over a silver oxidation catalyst at a temperature between 225° and 450° C., controlling the amounts of formaldehyde formed by adding to the reactants small amounts of one of the group consisting of halogens and halogenated organic compounds capable of being volatilized with said vapors, and recovering a hydrate of glyoxal from the oxidation products.

13. Process for making hydrates of pyruvic aldehyde which comprises passing the vapors of propylene glycol mixed with at least 1.8 mols of molecular oxygen per mol of glycol over a copper oxidation catalyst at a temperature of 225° to 450° C., and controlling the amounts of monocarbonylic compounds and carbon dioxide formed by adding to the reactants small amounts of one of the group consisting of halogens and halogenated organic compounds capable of being volatilized with said vapors.

RAYMOND W. McNAMEE.
JESSE T. DUNN.